United States Patent [19]

Sivyer

[11] 3,911,747

[45] Oct. 14, 1975

[54] THERMAL WELD MONITORING DEVICE

[76] Inventor: Robert B. Sivyer, P.O. Box 19023, Houston, Tex. 77024

[22] Filed: Nov. 9, 1973

[21] Appl. No.: 414,229

[52] U.S. Cl. .................. 73/343 R; 73/349; 136/230
[51] Int. Cl.² .......................................... G01K 1/08
[58] Field of Search ...... 73/343 R, 339 R, 346, 349, 73/362.8; 136/230, 232, 233

[56] References Cited
UNITED STATES PATENTS

| | | | |
|---|---|---|---|
| 2,202,533 | 5/1940 | Mason | 136/230 |
| 3,154,060 | 10/1964 | Hundere | 73/346 |
| 3,382,717 | 5/1968 | Keppel | 73/362.8 |

Primary Examiner—S. Clement Swisher
Assistant Examiner—Denis E. Corr

[57] ABSTRACT

Disclosed is a temperature monitoring system for high temperature fluid flow systems. In a furnace coil which conducts fluid, a tubular outer assembly is attached to a coil and extends through a furnace coil and has an exteriorly located flange. A replaceable tubular inner assembly is insertable through the outer assembly to project a temperature sensor into the coil and provide a metal-to-metal seal between the inner and outer assemblies at a location just outside of the coil. The seal is maintained by clamping the inner and outer assemblies to one another outside of the furnace. The inner assembly is designed for easy retrievable despite build-up of residue deposits.

5 Claims, 4 Drawing Figures

FIG. 1
FIG. 3
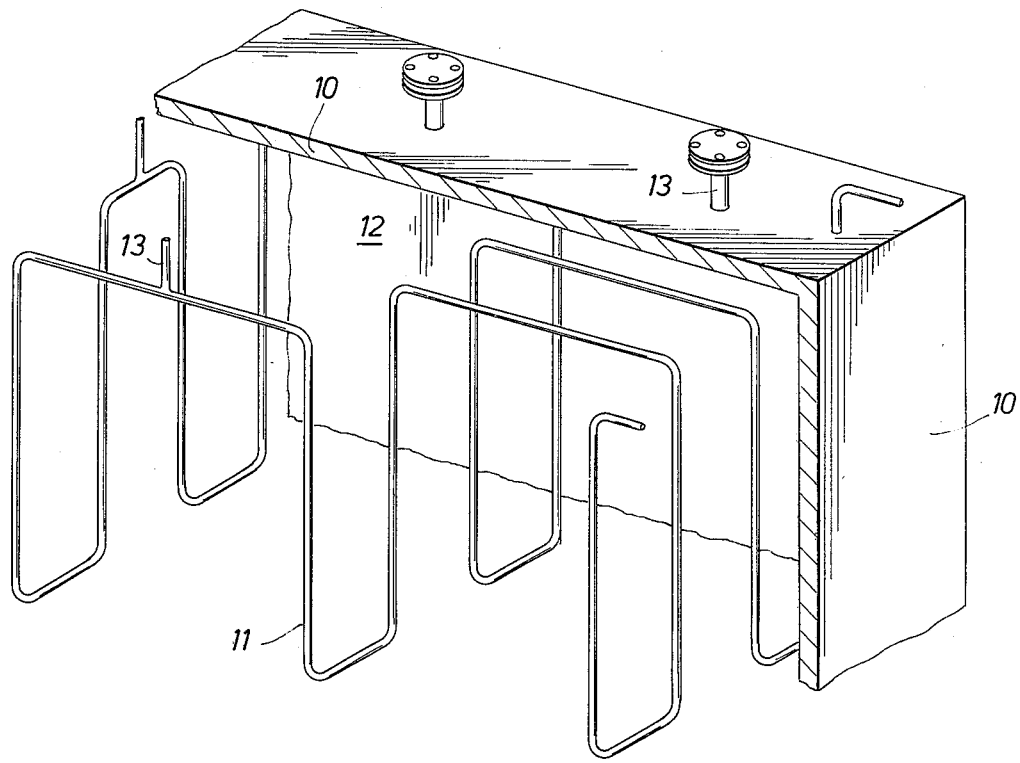
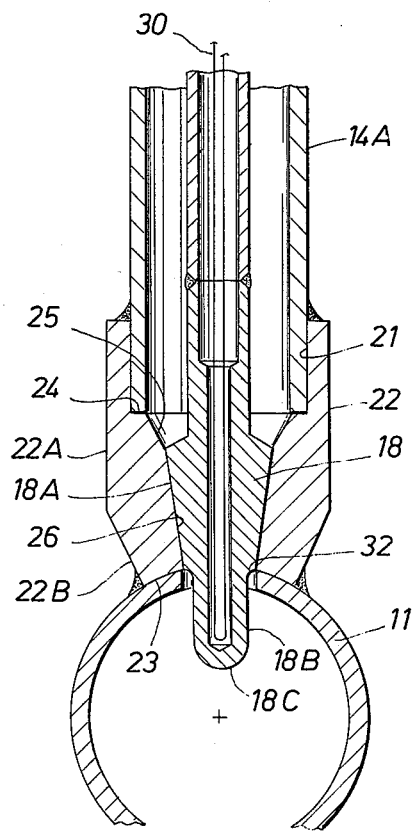

THERMAL WELD MONITORING DEVICE

BACKGROUND OF THE INVENTION

This invention relates to temperature monitoring systems for high temperature fluid flow systems, and more particularly, for replaceable thermal sensors for furnace coils.

In hydrocarbon processes, it is common to pass a fluid through a coil in a furnace to increase the temperature of the fluid for processing purposes. It is important to the process many times to control the temperature closely and one or more thermal sensors or thermo couples are commonly used. The systems heretofore have more or less permanently attached thermal sensors to the furnace or made a direct coupling to the furnace. In either instance, the high temperatures have caused problems in replacement and operation of the sensors. Where the sensor is connected to the furnace by a flange-to-flange seal on the outside of the furnace wall, the monitoring device frequently becomes encrusted with particulate making removal a time consuming operation.

SUMMARY OF THE PRESENT INVENTION

Disclosed is a system for monitoring temperatures within a furnace coil system by the use of elongated temperature measuring devices which extend from a location exterior to a furnace, through the exterior walls of a furnace system, and to coils located within the furnace. A tubular outer assembly is fixed at any desired location on a furnace coil by welding. The outer assembly has a tapered sealing surface adjacent to the opening to the coil. An inner assembly is insertable through the outer assembly and has a thermal sensor which passes through the opening to the coil and into the cross-section of the coil. The thermal sensor has a complementarily formed tapered sealing surface and the portion of the sensor extending into the coil through the opening in the coil has a reduced cross-section to facilitate removal. The tapered sealing surfaces are maintained in sealing engagement by releasable clamping means between the inner and outer assemblies.

BRIEF DESCRIPTION OF THE DRAWINGS

The invention may be best understood by reference to the following drawings included as a part of this specification, and in which:

FIG. 1 is a schematic illustration of a furnace with interior coils and the temperature monitoring means of the present invention;

FIG. 3 is a detailed view in cross-section of the details of one form of monitoring tip assembly.

DESCRIPTION OF THE PREFERRED EMBODIMENT

Figure 2:
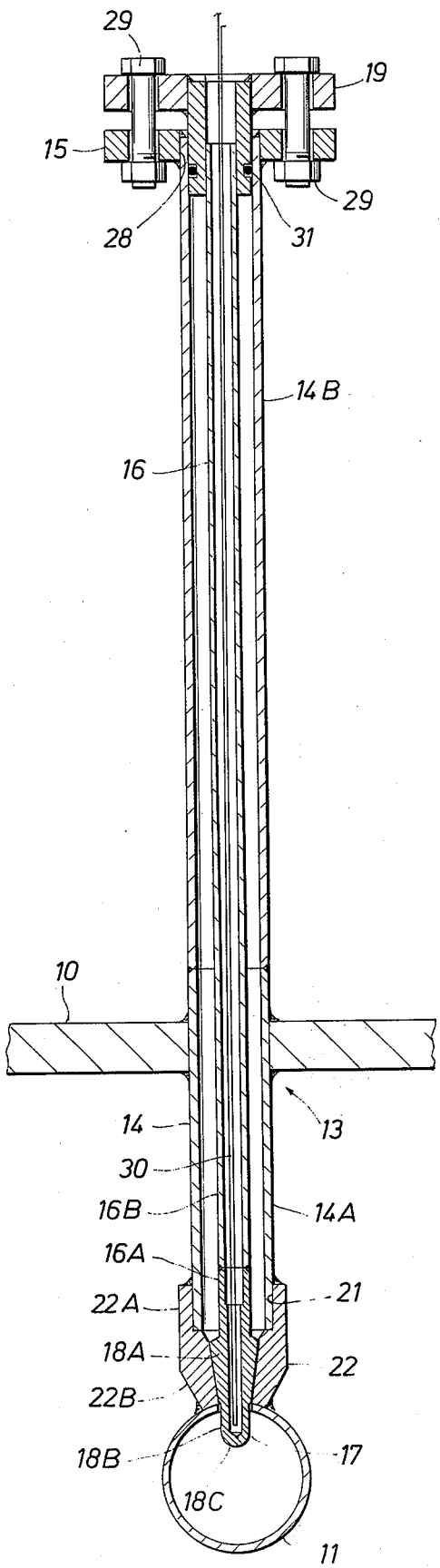
FIG. 2 is a detailed view in cross-section of a monitoring device of the present invention and shows the exterior casing, the interior monitoring mechanism and its attachment to the furnace coils, and the flange apparatus for applying pressure for the monitoring tip.

Referring now to the drawings, FIG. 1 is a partial illustration of a furnace apparatus which includes the external furnace walls 10 which enclose a system of coils 11 and a source of heat (not shown). The coils 11 are tubular conduits disposed in a tortuous path in the furnace enclosure and are ordinarily used to conduct a fluid through the furnace and the fluid is heated to the temperature within the furnace enclosure 12. To monitor the temperature of fluid in the coil system, temperature monitoring devices 13 are positively coupled to the furnace coil system 11 and protrude outwardly through the furnace walls 10. Although the system disclosed has many applications, it is especially applicable in oil refinery hydrocarbon processes for heating of ethane gas. In the present invention, the temperature monitoring devices are constructed and arranged for easy installation and replacement.

Referring now to FIG. 2, a detailed cross-sectional view of a temperature monitoring device 13 is illustrated in cross-section in a coil 11. The temperature monitoring device 13 includes a tubular outer assembly 14 which is attached to a coil 11, extends through a furnace wall 10 and has flange portion 15 disposed on the exterior of the furnace. Releasably received within the tubular outer assembly 14 is a tubular inner assembly 16 which has a terminal end 17 protruding through an opening 18 of the outer assembly 14. The terminal end 17 extends into the cross-section of the coil 11 to an immersion depth necessary to monitor accurate temperatures. The inner assembly 16 has a flange portion 19 disposed on the exterior of the furnace in juxtaposition to the flange portion 15 of the tubular outer assembly 14.

The outer tubular assembly 14 includes end-to-end tubular members 14a and 14b which are joined together by welding and which respectively are constructed of high alloy nickel, chrome, iron, suitable for resisting high temperatures, and low alloy or carbon steel for use outside the furnace. One end of the tubular member 14a is slidably received in an annular socket recess 21 in a socket fitting member 22 and joined to the member 22 by welding. The fitting member 22 has a generally cylindrically shaped outer surface 22a which joins a conical tapered surface 22b. The end of the fitting member 22 which faces a coil has a cylindrically curved surface 23 (see FIG. 3) which is complementary to the curvature of the coil surface thereby permitting close positioning of the fitting member 22 to the coil surface and attachment thereto by welding. The annular recess or socket 21 in the fitting member 22 is sized to receive the tubular member 14b. Below the shoulder 24 of the annular recess 21, the opening therethrough is defined by a first concially tapered or bevelled surface 25 and an adjoining, second conically tapered sealing surface 26 which extends to and terminates at the outer curved surface 23.

The tubular members 14a and 14b are thin-walled cylindrical pipes which extend from the fitting member 22 to a location outside the furnace wall 10. The coupling flange 15 at the end of the tubular member 14b is annularly shaped with its central opening 28 sized to receive the tubular member 14b. The flange 15 is rigidly attached to the tubular member 14b by suitable welds. The coupling flange 15 is also provided with peripherically disposed bolt holes so that the flange 15 may be positively coupled with coupling flange 19 on the inner tubular member by means of bolts 29 in a manner which will be hereinafter described.

The function of the tubular outer assembly 14 is to provide a means to transmit closure force of coupling flanges 15 and 19 to the mating surfaces of tapered surface 25 and tapered surface 26. The tubular inner assembly 16 is received within tubular outer assembly 14 and provided with seal means so that the fluid in the coils does not escape. The inner assembly means 16 includes a tubular member 16b which is butt-welded or connected at one of its ends to a thermal monitoring tip 16a. At the other end of the tubular member is a sealing plug and coupling flange 19. The thermal monitoring tip 18 is defined by an enlarged tubular portion with a conically tapered sealing surface 18a and a tubular section 18b which terminates with semi-spherical surface 18c. The terminal tip portion 18c formed by the tubular section 18 protrudes into the interior of the furnace coil 11 such that it is in contact with the fluid passing through the furnace coil 11 such that it is in contact with the fluid passing through the furnace coil and can accurately monitor the temperature of the fluid contained therein. The interior of the tubular section is hollow and formed by thin walls and receives a conventional, electrical bimetallic thermal monitoring means 30. The conically tapered sealing surface 18a has a taper or configuration which coincides or complements a first interior tapered surface 26 of the fitting member 22 in order to provide a positive metal-to-metal seal between the first interior tapered surface 26 and the exterior sealing surface in a manner which will be hereinafter described.

At the extreme left, the tubular member 16 of thermal monitoring means is received in a central opening of a cylindrically formed sealing part on the flange 29. Along the length of the sealing part is an annular sealing groove 55 which receives a sealing means 31. The sealing part is rigidly attached to the annular coupling flange 19. The coupling flange 19 is cylindrically shaped similar to coupling flange 15 and is further provided with peripherically shaped bolt holes.

It will be appreciated that the thermal monitoring means 16 with the monitoring tip 18 and the sealing part on the coupling flange 19 can be inserted into the outer tubular assembly 14 and the sealing surfaces 18a and 26 brought into engagement. At this time the flanges 15 and 19 are slightly separated from one another and bolts 29 are used to apply the necessary sealing pressure between the sealing surfaces 18a and 26.

The terminal opening of the hole at the end of surface 18a (see FIG. 3) has a diameter which is larger than the diameter of the tubular section 18b of the inner assembly 16. The difference in diameter can, for example, be about ⅛" where the tubular section 18b terminates at the terminal opening 32. The difference in diameter prevents a build-up of "coke" during the processing of ethylene and the consequent enlargement of the section 18b to a size greater than the size of the opening 32 thereby preventing easy retrieval of the tip from the opening. The width of the spacing or narrowest dimension between the outer wall 22b and the opening 32 is made sufficiently large to prevent warping of the socket member when it is welded. The wall thickness of the stem is also made great enough to prevent bowing of the stem under compression. The outer housing can be made in two parts where the upper part is of less expensive steel which does not have the higher temperature requirements.

Figure 4:
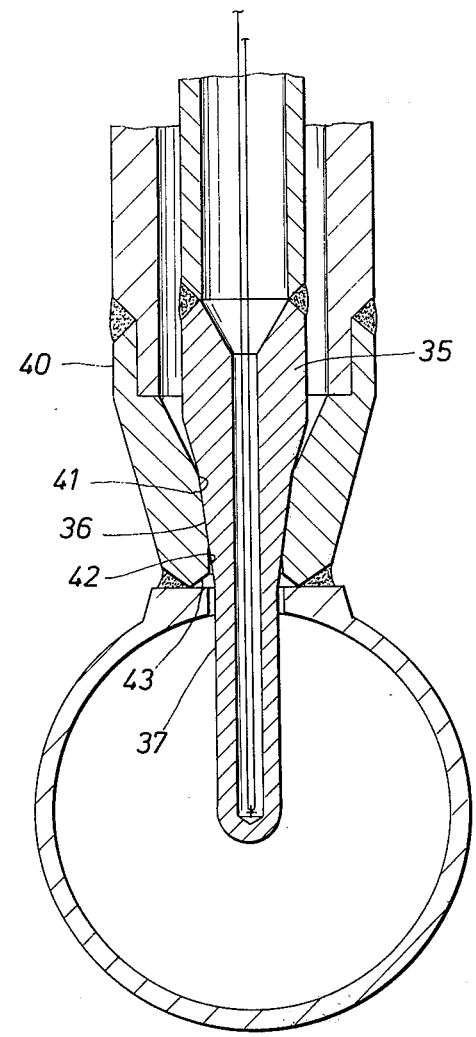
FIG. 4 is a detailed view in cross-section of the details of another form of monitoring tip assembly.

Referring now to FIG. 4, in this form of the temperature monitoring assembly joined by welding to the outer sweep of a return bend being part of furnace coil 11, the tubular inner member 35 has a tapered surface 36 which joins a cylindrical surface 37 which has a spherically shaped terminal end 38. The tubular outer assembly includes a fitting member 40 with an internal tapered surface 41 which is complementarily formed to the tapered surface 36 and adjoining bore 42 which is sized to the opening in the coil 11. The fitting member has a slight bevel at the end of the bore 42 and a tapered outer surface 44. Surfaces 43 and 44 permit the penetration of the weld and a more effective sealing attachment of the fitting member to the coil 11. The diameter of the opening 42 to permit retrieval despite of residue deposits on the tip.

While particular embodiments of the present invention have been shown and described, it is apparent that changes and modifications may be made without departing from this invention in its broader aspects; and therefore, the aim in the appended claims is to cover all such changes and modifications as fall within the true scope and spirit of this invention.

What is claimed is:

1. A temperature monitoring system for use in a coil in a furnace where fluid passed through the coil is heated in the furnace to high temperatures including:

a tubular outer assembly including at one end a fitting member adapted for welding connection to a furnace coil and at its opposite end a first coupling member adapted to be disposed exterior to a furnace wall, said tubular outer assembly including an interior conically tapered sealing surface in said fitting member, a tubular inner assembly including terminal sensor means sized for passage through said outer assembly and an adjoining exterior, conically tapered sealing surface, said exterior and interior sealing surfaces being complementarily formed, said exterior sealing surface being longitudinally spaced from said terminal sensor means so that when said sealing surfaces are in sealing engagement, said terminal sensor means are disposed within the interior of a coil, said sensor means having a portion thereof which is undersized relative to the cross section of the exit opening of said fitting member for accomodating a residue build-up within a coil without hindering removal of said sensor means from said fitting member, said sensor means having a spherically formed terminal portion, said fitting member having adjoining bevelled and tapered end surfaces for enhancement of the weld penetration relative to a furnace coil, and coupling means on said inner and outer assemblies and longitudinally spaced from said sealing surfaces so that said coupling means are locatable exterior to a furnace, said coupling means being cooperable for maintaining said sealing surfaces in a sealing relationship.

2. The apparatus as defined in claim 1 wherein said fitting member has a curved end surface with sufficient width for exterior welding to a coil without distortion to the interior sealing surface.

3. A temperature monitoring system for use in a coil in a furnace where fluid passed through the coil is heated in the furnace to high temperatures including:

furnace means including furnace walls and a coil system for carrying fluid disposed within said furnace walls, a tubular outer assembly including at one end a fitting member welded to a furnace coil and at its opposite end a first coupling member disposed exterior to a furnace wall, said tubular outer assembly including an interior conically tapered sealing surface in said fitting member, said interior sealing surface having an opening sized to a corresponding and adjoining opening in said coil, said outer assembly being connected to said furnace walls, a tubular inner assembly including terminal sensor means sized for passage through said outer assembly and an adjoining exterior, conically tapered sealing surface, said exterior and interior sealing surfaces being complementarily formed, said exterior sealing surface being longitudinally spaced from said terminal sensor means so that when said sealing surfaces are in sealing engagement, said terminal sensor means are disposed within the interior of said coil, and coupling means on said inner and outer assemblies exterior to said furnace wall, said coupling means being longitudinally spaced from said sealing surfaces so that said coupling means are located exterior to said furnace, said coupling means being cooperable for maintaining said sealing surfaces in a sealing relationship.

4. A temperature monitoring system for a fluid flow system within a high temperature furnace comprising:

a furnace enclosure defined by walls and containing therein fluid flow coils for conveying fluid to be heated through the furnace, means for releasably disposing a temperature sensor means to a coil within said furnace including a tubular outer assembly extending through a furnace wall and having a fitting member, said fitting member and outer assembly respectively being welded to a coil and to a furnace wall, said outer assembly having an open end extending outwardly of said furnace wall, said fitting member having an interior, conically tapered sealing surface which opens to the interior of the coil, a tubular inner assembly sized for passage through said outer assembly and having terminal sensor means disposed adjacent to an adjoining exterior, conically tapered sealing surface, said exterior sealing surface being complementarily formed to said interior sealing surface, said terminal sensor means being longitudinally spaced relative to said exterior sealing surface so that when said surfaces are in sealing engagement, said terminal sensor means are disposed within the interior of the coil, and means on the open ends of said inner and outer assemblies exterior to said furnace wall for coupling said assemblies to one another and for applying and maintaining a sealing pressure to said sealing surfaces.

5. The apparatus as defined in claim 4 wherein the portion of said sensor means extending into the interior of the coil is undersized relative to the cross section of the opening for accomodating a residue build-up within the coil without hindering removal of said sensor means from said opening, said fitting member having bevelled surfaces for facilitating a weld to said coil and said sensor means having a spherically shaped terminal portion.

* * * * *